United States Patent
Ye

(10) Patent No.: US 12,313,141 B2
(45) Date of Patent: May 27, 2025

(54) ROLL-ROD FOR VEHICLE

(71) Applicants: Hyundai Motor Company, Seoul (KR); Kia Corporation, Seoul (KR)

(72) Inventor: Jin Uk Ye, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 448 days.

(21) Appl. No.: 17/983,205

(22) Filed: Nov. 8, 2022

(65) Prior Publication Data
US 2023/0383814 A1 Nov. 30, 2023

(30) Foreign Application Priority Data
May 30, 2022 (KR) .................. 10-2022-0065742

(51) Int. Cl.
*B60K 5/12* (2006.01)
*F16F 1/38* (2006.01)
*F16F 15/08* (2006.01)
*B60K 17/00* (2006.01)

(52) U.S. Cl.
CPC ............ *F16F 15/08* (2013.01); *B60K 5/1208* (2013.01); *B60K 17/00* (2013.01)

(58) Field of Classification Search
CPC . F16F 15/08; F16F 1/38; F16F 1/3849; B60K 5/12; B60K 5/1208; B60K 5/1241; B60K 17/00
See application file for complete search history.

(56) References Cited

U.S. PATENT DOCUMENTS

| | | | | |
|---|---|---|---|---|
| 8,556,242 | B2 * | 10/2013 | Kim | F16F 3/0873 267/141.5 |
| 9,212,716 | B2 * | 12/2015 | Yoon | F16F 15/08 |
| 9,273,753 | B2 * | 3/2016 | Yun | F16F 15/08 |
| 9,476,479 | B2 * | 10/2016 | Nakamura | F16F 1/3842 |
| 9,815,361 | B2 * | 11/2017 | Patel | F16F 1/3842 |
| 10,131,219 | B2 * | 11/2018 | Scharf | B60K 5/1266 |
| 10,436,279 | B2 * | 10/2019 | Kim | B60K 5/1241 |
| 10,518,623 | B2 * | 12/2019 | Takahashi | F16F 7/108 |
| 10,654,351 | B2 * | 5/2020 | Han | B60K 5/1241 |
| 10,780,768 | B2 * | 9/2020 | Tanaka | B60K 5/1291 |
| 10,981,441 | B2 * | 4/2021 | Tanaka | F16F 1/3828 |
| 11,383,591 | B2 * | 7/2022 | Kim | B60K 5/1241 |
| 11,607,943 | B2 * | 3/2023 | Kim | B29C 48/022 |

(Continued)

*Primary Examiner* — Thomas W Irvin
(74) *Attorney, Agent, or Firm* — Morgan, Lewis & Bockius LLP

(57) ABSTRACT

A roll-rod for a vehicle includes a rod bracket including mounted therein a front insulator to be connected to a powertrain apparatus, a first rear insulator disposed on a rod bar extending from the rod bracket and configured to reduce vibration transmitted from the outside thereof, a case bracket disposed on the rod bar and connected to a subframe, a second rear insulator disposed to face the first rear insulator with the case bracket as a boundary therebetween and configured to reduce vibration transmitted from the outside thereof, and a coupling member inserted into the rod bar and passing through the first rear insulator and the second rear insulator to be coupled thereto but configured to selectively change the compression amounts of the first rear insulator and the second rear insulator depending on coupling positions of the coupling member.

8 Claims, 7 Drawing Sheets

(56) References Cited

U.S. PATENT DOCUMENTS

| | | | | |
|---|---|---|---|---|
| 11,780,311 | B2* | 10/2023 | Kadowaki | B60K 5/1208 |
| | | | | 267/140.3 |
| 12,214,665 | B2* | 2/2025 | Valenzuela | F16F 7/10 |
| 2012/0133091 | A1* | 5/2012 | Kim | F16F 3/0873 |
| | | | | 267/293 |
| 2015/0204406 | A1* | 7/2015 | Yoon | F16F 15/03 |
| | | | | 248/562 |
| 2015/0204414 | A1* | 7/2015 | Yun | F16F 15/08 |
| | | | | 248/635 |
| 2015/0240908 | A1* | 8/2015 | Pizanti | F16C 7/04 |
| | | | | 248/634 |
| 2016/0053848 | A1* | 2/2016 | Nakamura | F16F 1/3842 |
| | | | | 248/634 |
| 2016/0221430 | A1* | 8/2016 | Kim | B60K 5/1241 |
| 2017/0028834 | A1* | 2/2017 | Patel | F16F 1/3863 |
| 2017/0182875 | A1* | 6/2017 | Scharf | F16F 1/3849 |
| 2018/0347660 | A1* | 12/2018 | Kim | F16F 13/08 |
| 2019/0047394 | A1* | 2/2019 | Han | B60K 5/1208 |
| 2019/0054812 | A1* | 2/2019 | Tanaka | F16F 15/08 |
| 2019/0054813 | A1* | 2/2019 | Tanaka | B60K 5/1208 |
| 2020/0384844 | A1* | 12/2020 | Kim | B60K 5/1291 |
| 2021/0061083 | A1* | 3/2021 | Kim | B60K 5/1241 |
| 2022/0176792 | A1* | 6/2022 | Kadowaki | B60K 5/1208 |
| 2022/0371426 | A1* | 11/2022 | Obata | B60K 5/1241 |
| 2023/0166590 | A1* | 6/2023 | Valenzuela | B60K 5/1216 |
| | | | | 248/559 |

* cited by examiner

ROLL-ROD FOR VEHICLE

CROSS-REFERENCE TO RELATED APPLICATION

The present application claims priority to Korean Patent Application No. 10-2022-0065742, filed on May 30, 2022, the entire contents of which is incorporated herein for all purposes by this reference.

BACKGROUND OF THE PRESENT DISCLOSURE

Field of the Present Disclosure

The present disclosure relates to a roll-rod for a vehicle, and more particularly, to a roll-rod for a vehicle capable of selectively changing the characteristics of an insulator to satisfy noise, vibration, and harshness (NVH) performance and R&H performance, and easily securing a package mounted on a subframe.

Description of Related Art

Generally, in a passenger vehicle, a monocoque body with light weight and excellent productivity is mainly used instead of a frame body. Such a monocoque body has a structure in which a separate frame is removed, and a powertrain apparatus including an engine and a transmission that are combined is directly mounted in an engine compartment of a vehicle body.

For the present reason, in the monocoque body, the vehicle body itself functions as a frame, and suspension and chassis are mounted respectively, but a subframe is mounted on the lower portion of the vehicle to prevent the vibration of the powertrain apparatus from being directly transmitted to the vehicle body and to distribute the impact in the event of vehicle collision.

The subframe has mounted thereon a suspension system, a steering system and others, and is connected to the lower portion of the powertrain apparatus through the roll-rod. In other words, the vehicle body has opposite sides including mounted thereto an engine mount and a transmission mount, respectively, to support the load of the powertrain apparatus, and the roll-rod mounted to the subframe is configured to control the displacement of the powertrain apparatus and dampens vibration.

Meanwhile, the related art roll-rod, as illustrated in FIG. 1A and FIG. 1B, includes a bar-shaped rod 10 including a front end portion connected to a powertrain apparatus, and an end plate 20 coupled to an end portion of a pipe 12 extending rearwards from the rod 10. The rod 10 and the end plate 20 have mounted therebetween a main case 30 to be fixed to a subframe. A front insulator 40 and a rear insulator 50 made of rubber material (or synthetic resin material) are disposed side by side on the front and rear sides of the main case 30, respectively.

Furthermore, the rod 10 has a front end portion to which a front bush 14 is mounted to be connected to the powertrain apparatus. When the end plate 20 is fitted onto the pipe 12, a bolt 16 is inserted into the pipe 12, coupling the front insulator 40, the main case 30, the rear insulator 50, and the end plate 20 together.

Furthermore, the front insulator 40 and the rear insulator 50 control the behavior of the powertrain apparatus when the vehicle moves forwards and rearwards, and elastically deform to insulate vibration.

For example, when the vehicle accelerates or stops suddenly, the rod 10 moves forwards or rearwards by the behavior of the powertrain apparatus due to inertia, and the front insulator 40 and the rear insulator 50 are supported by a partition wall 34 of a case bracket 30, having formed therein a hole 32 through which the pipe 12 of the rod 10 passes, and are elastically compressed.

In other words, the roll-rod performs a damping function by the rear insulator 50 being compressed by the displacement of the powertrain apparatus due to inertia when the vehicle moves forwards, and by the front insulator 40 being compressed when the vehicle moves rearwards or decelerates. The roll-rod controls the behavior and vibration insulation performance of the powertrain apparatus, and accordingly affects noise, vibration, and harshness (NVH) performance and ride & handling (R&H) performance.

However, because NVH performance and R&H performance conflict with each other, and generally, the higher the characteristics of R&H, the lower the characteristics of NVH, the more advantageous it is in terms of performance, the roll-rod is one of the components which is difficult to select.

After all, because the roll-rod is related to NVH performance and R&H performance, which conflict with each other, it is often necessary to change the characteristics of the insulator after performing an actual vehicle evaluation. However, when the characteristics are changed, a new mold for producing the insulator needs to be additionally manufactured, generating excessive working hours and costs.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a roll-rod for a vehicle, the roll-rod including a structure in which a pair of rear insulators each includes an insulator rubber portion and an insulator core portion that are combined with each other, the rear insulators disposed to face each other each has formed therein a pair of through holes, and a coupling member is inserted into the holes to fix the rear insulators in the state in which the compression amount of the insulator rubber portion is selectively changed. With the present structure, the roll-rod may easily secure a space on a subframe, and the characteristics of the insulator may be easily changed to satisfy noise, vibration, and harshness (NVH) performance and R&H performance that conflict with each other.

Various aspects of the present disclosure are directed to providing a roll-rod for a vehicle, the roll-rod including a rod bracket including a front insulator therein to be connected to a powertrain apparatus, a first rear insulator disposed on a rod bar extending from the rod bracket and configured to reduce vibration transmitted from the outside thereof, a case bracket disposed on the rod bar and connected to a subframe, a second rear insulator disposed to face the first rear insulator with the case bracket as a boundary therebetween and configured to reduce vibration transmitted from the outside thereof, and a coupling member inserted into the rod bar and passing through both the first rear insulator and the second rear insulator to be coupled thereto but configured to selectively change the compression amounts of the first rear insulator and the second rear insulator depending on coupling positions of the coupling member.

In an exemplary embodiment of the present disclosure, the first rear insulator may include a pair of insulator rubber portions spaced from each other in a widthwise direction, and made of an elastic material to be compressible in a front and rear direction, and an insulator core portion located between the insulator rubber portions, and having formed therein a through hole into which a coupling member is inserted.

In another exemplary embodiment of the present disclosure, the insulator rubber portion may have an inclined surface at the position where the insulator core portion is accommodated, and allow the compression amount to be increased as the coupling member is inserted into the insulator core portion to press the inclined surface in a selectively compressed or uncompressed state depending on the characteristics during assembly.

In yet another exemplary embodiment of the present disclosure, the coupling member may include a main body accommodated on the upper surface of the rod bar, and a pair of coupling guides protruding from the main body, wherein one of the coupling guides passes through a first coupling hole in the rod bar and is inserted into a first through hole in the first rear insulator, and another one of the coupling guides passes through a second coupling hole in the rod bar and is inserted into a second through hole in the second rear insulator.

In yet another exemplary embodiment of the present disclosure, the first through hole and the second through hole each may be divided into a pair in the front and rear direction of the rod bar.

In still yet another exemplary embodiment of the present disclosure, the coupling member may fix the first rear insulator and the second rear insulator in the compressed state as the coupling guides are inserted into the first through hole and the second through hole each located at the external side of the divided first through hole and the second through hole.

In a further exemplary embodiment of the present disclosure, the case bracket may include a partition provided with a pair of bent portions each including a 'H' shape to seat thereon the upper and lower portions of the rod bar, and dividing the first rear insulator from the second rear insulator in the rod bar, and a case bracket housing surrounding the external circumferential surfaces of the first rear insulator and the second rear insulator, and coupled to the external side of the subframe.

In another further exemplary embodiment of the present disclosure, the first through hole and the second through hole may include a first internal side through hole and a second internal side through hole configured to reduce the compression amount of the insulator rubber portion, and a first external side through hole and a second external side through hole configured to increase the compression amount of the insulator rubber portion.

Other aspects and exemplary embodiments of the present disclosure are discussed infra.

It is to be understood that the term "vehicle" or "vehicular" or other similar terms as used herein are inclusive of motor vehicles in general, such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuels determined from resources other than petroleum). As referred to herein, a hybrid vehicle is a vehicle that has two or more sources of power, for example, a vehicle powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

Figure 1A:
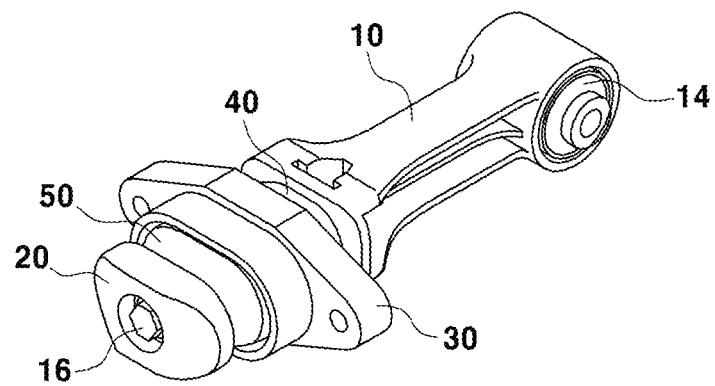
FIG. 1A and FIG. 1B are views exemplarily illustrating the related art roll-rod for a vehicle.

It may be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Description will now be provided in detail according to exemplary embodiments included herein, with reference to the accompanying drawings.

Advantages and features of the present disclosure, and methods of achieving the same, will be apparent with reference to the exemplary embodiments described below in detail However, the present disclosure may be embodied in various forms, and may not be construed as being limited to the exemplary embodiments set forth herein. Rather, the exemplary embodiments are provided so that the present disclosure will be thorough and complete, and will fully convey the scope of the present disclosure to those skilled in the art. The present disclosure is defined only by the categories of the claims.

In describing the present disclosure, if a detailed explanation of a related known function or construction is considered to unnecessarily divert the gist of the present disclosure, such explanation has been omitted but would be understood by those skilled in the art.

Figure 2:
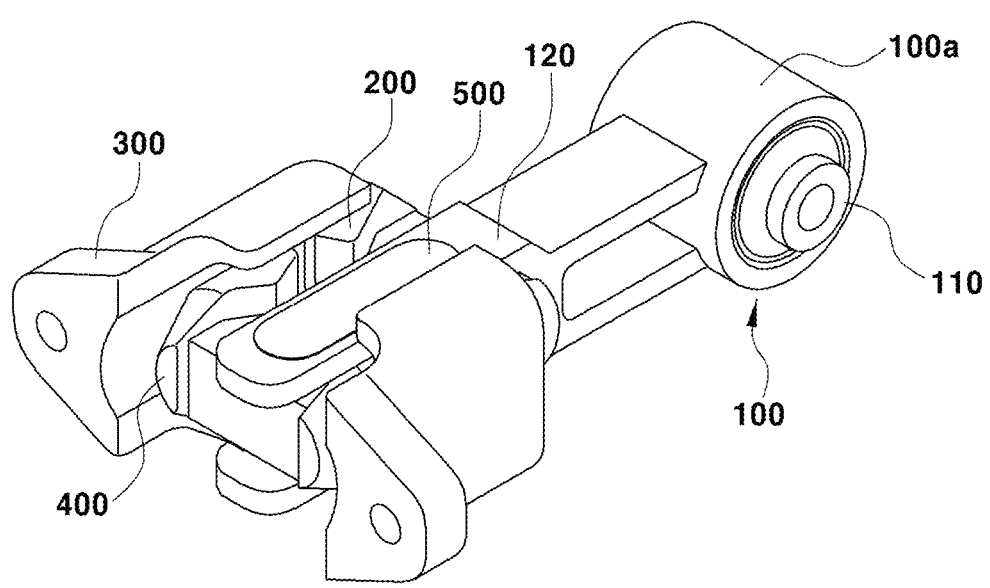
FIG. 2 is a view exemplarily illustrating the state in which a roll-rod for a vehicle according to various exemplary embodiments of the present disclosure is coupled.
Figure 3A:
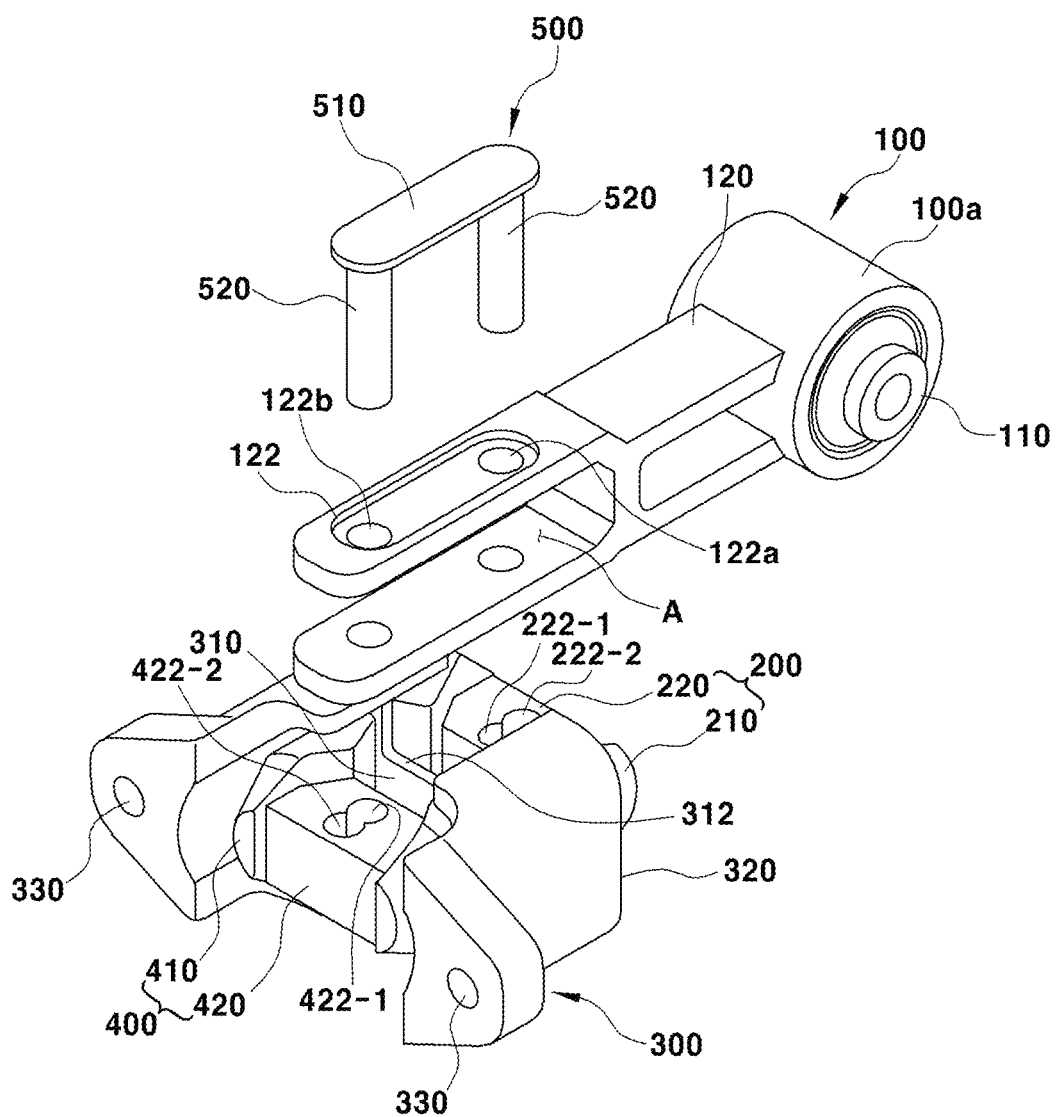
FIG. 3A and FIG. 3B are views exemplarily illustrating the state in which a roll-rod for a vehicle according to various exemplary embodiments of the present disclosure is separated.
Figure 3B:
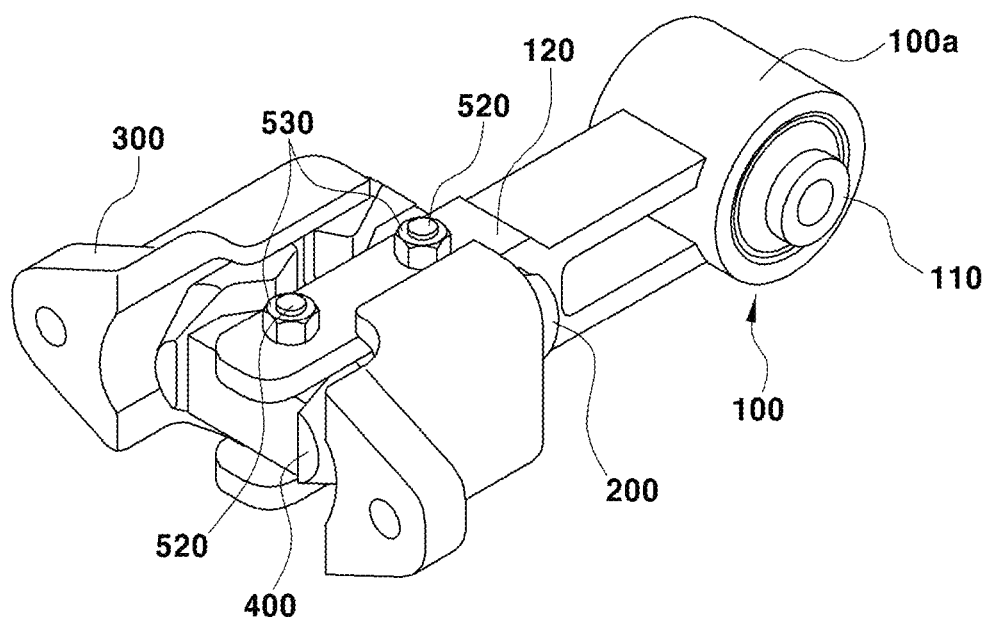

FIG. 2 is a view exemplarily illustrating the state in which a roll-rod for a vehicle according to various exemplary embodiments of the present disclosure is coupled, and FIG. 3A and FIG. 3B are views exemplarily illustrating the state in which a roll-rod for a vehicle according to various exemplary embodiments of the present disclosure is separated.

Figure 4A:
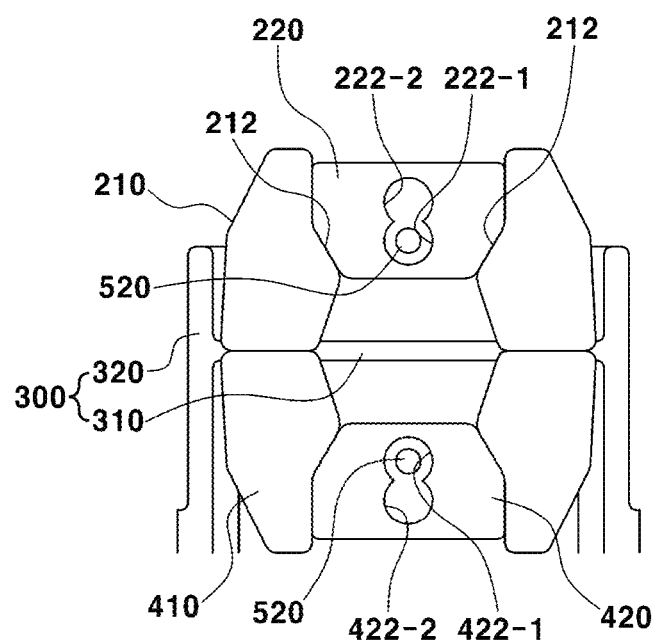
FIG. 4A and FIG. 4B are views exemplarily illustrating changes in compression amount of a first rear insulation and a second rear insulation of a roll rod for a vehicle according to various exemplary embodiments of the present disclosure.
Figure 4B:
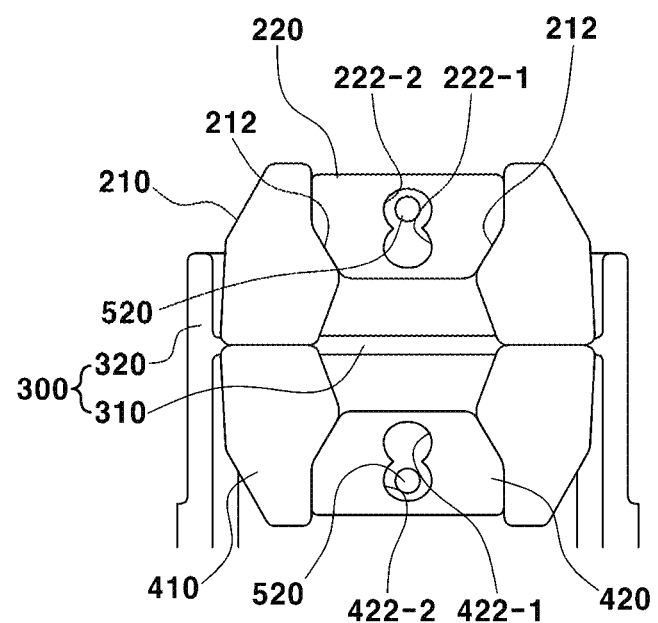
Figure 5:
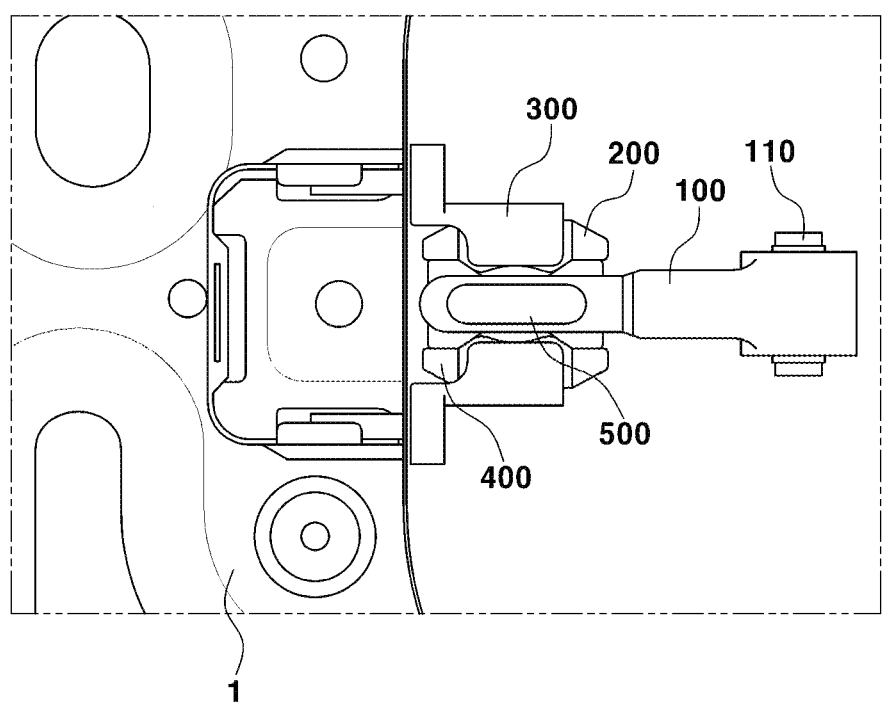
FIG. 5 is a view exemplarily illustrating the state in which a roll-rod for a vehicle according to various exemplary embodiments of the present disclosure is coupled.

FIG. 4A and FIG. 4B are views exemplarily illustrating changes in compression amount of a first rear insulation and a second rear insulation of a roll rod for a vehicle according to various exemplary embodiments of the present disclosure, and FIG. 5 is a view exemplarily illustrating the state in which a roll-rod for a vehicle according to various exemplary embodiments of the present disclosure is coupled.

Generally, a roll rod for a vehicle is configured to control the behavior of a powertrain apparatus, and affects noise, vibration, and harshness (NVH) performance and ride & handling (R&H) performance.

Figure 1B:
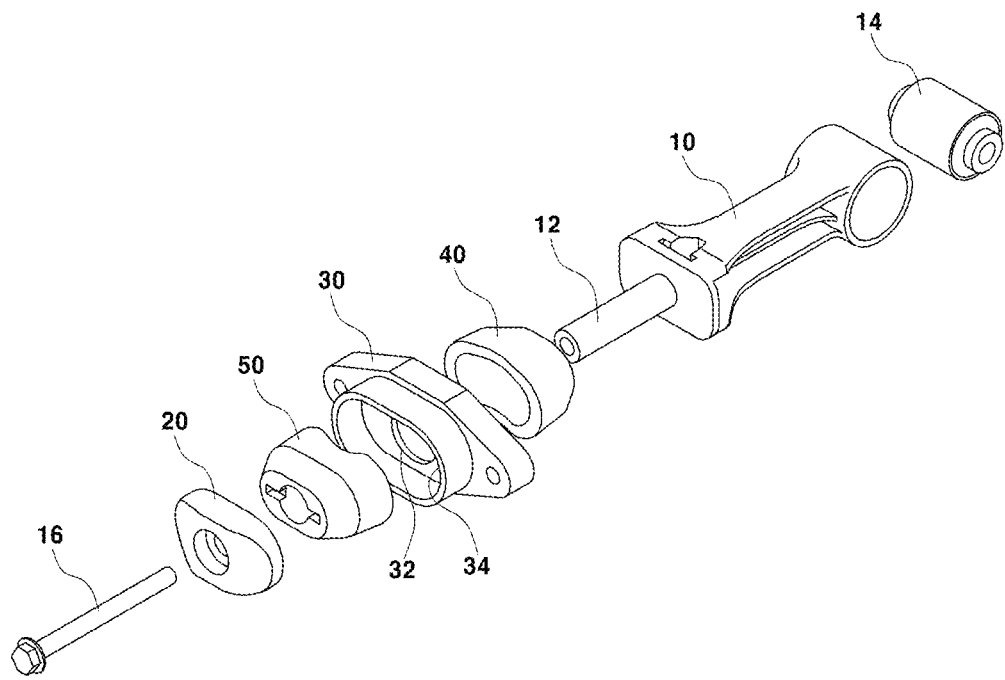

For example, in the related art roll-rod for a vehicle, when a large load is input due to a traveling situation such as sudden acceleration or sudden stop, the front insulator 40 or the rear insulator 50 is deformed (see FIG. 1A and FIG. 1B). However, when a large load is input as described above, the incompressibility of the front insulator 40 or the rear insulator 50 increases, resulting in a problem that vibration insulation performance against additional displacement rapidly deteriorates.

In other words, as the compression amount of the front insulator 40 or the rear insulator 50 increases, the rigidity thereof increases, resulting in a problem in which NVH performance such as idle vibration and rattling deteriorates (see FIG. 1A and FIG. 1B). Accordingly, there may be a demand to solve the above problems by reducing the compression characteristics of the insulator.

However, on the other hand, when the compression characteristics of the insulator are reduced, R&H performance degradation such as unity in traveling, rough road traveling, and a shock after impact occurs. For the present reason, a request to solve the above problems may be made by increasing the compression characteristics of the insulator.

After all, because the roll-rod relates to the conflicting NVH performance and R&H performance, it is often necessary to change the characteristics of the insulator after performing an actual vehicle evaluation. In the instant case, a new mold for changing the characteristics of the insulator needs to be separately manufactured, which may result in excessive man-hours and manufacturing costs.

To solve such a problem, as illustrated in FIGS. 2, 3A, and 3B, the roll-rod for a vehicle according to the present exemplary embodiment includes a rod bracket 100, a first rear insulator 200, a case bracket 300, a second rear insulator 400, and a coupling member 500.

The rod bracket 100 has one end portion including a circular connecting portion 100a configured to connect a powertrain apparatus with a vehicle, because a front insulator 110 is press-fitted into the connecting portion 100a, and the center portion of the front insulator 110 is connected to the powertrain apparatus, vibration transmitted from the powertrain apparatus may be primarily reduced.

Furthermore, the first rear insulator 200 is disposed in an internal region A in a rod bar 120, extending from the rod bracket 100, and configured to reduce vibration transmitted from the outside.

In other words, because the first rear insulator 200 is disposed at the front side of the internal region A, when a vehicle suddenly stops, the first rear insulator 200 is elastically compressed due to the displacement of the powertrain apparatus caused by inertia to provide damping, reducing vibration.

Here, the first rear insulator 200 includes an insulator rubber portion 210 and a first insulator core portion 220.

The insulator rubber portion 210 is provided in a pair and spaced from each other in a widthwise direction, and is made of an elastic material to be compressible in a front and rear direction thereof.

The insulator rubber portions 210, including internal side surfaces thereof facing each other, each has an inclined surface 212 bent inwards to accommodate the first insulator core portion 220 therein. With the present configuration, the first insulator core portion 220 moves to selectively press the inclined surfaces 212 to increase the amount of compression.

The first insulator core portion 220 is accommodated inside the insulator rubber portion 210 by the inclined surfaces 212 described above, that is, the space between the pair of insulator rubber portions 210 facing each other, and has formed therein a through hole into which a coupling member 500 is inserted.

Furthermore, the case bracket 300 is disposed in the internal region A in the rod bar 120, and as illustrated in FIG. 5, is coupled to the external circumferential surface of a subframe 1 using a bolt or the like to be connected to the subframe 1.

The case bracket 300 includes a partition 310 and a case bracket housing 320.

The partition 310 is provided with a pair of bent portions 312 each including a 'H' shape and formed in a vertical direction to seat thereon the upper and lower portions of the rod bar 120 that defines the internal region A.

Furthermore, the partition 310 divides the rear insulator into the first rear insulator 200 and the second rear insulator 400 in the internal region A, and as vibration is generated from the outside thereof in the fixed state, the partition 310 allows the first rear insulator 200 or the second rear insulator 400 to be supported and elastically compressed.

The case bracket housing 320 surrounds the external circumferential surfaces of the first rear insulator 200 and the second rear insulator 400 to support vibration (load) transmitted from the outside thereof, and is coupled to the external side of the subframe 1 using a pair of fixing grooves 330, which is to be fixed to the subframe 1.

The case bracket housing 320 has a coupling area, which has formed therein the fixing grooves 330, and the coupling area is bent to be coupled to the external side of the subframe 1 in the state in which the first rear insulator 200 and second rear insulator 400 are divided by the partition 310 and the external circumferential surfaces of the first rear insulator 200 and the second rear insulator 400 are supported by the case bracket housing 320. The present structure makes it easier to secure a package to be mounted on the subframe 1 to which a rack type motor driven power steering (R-MDPS) module is applied, compared to the structure of the related art roll-rod.

Figure 6:
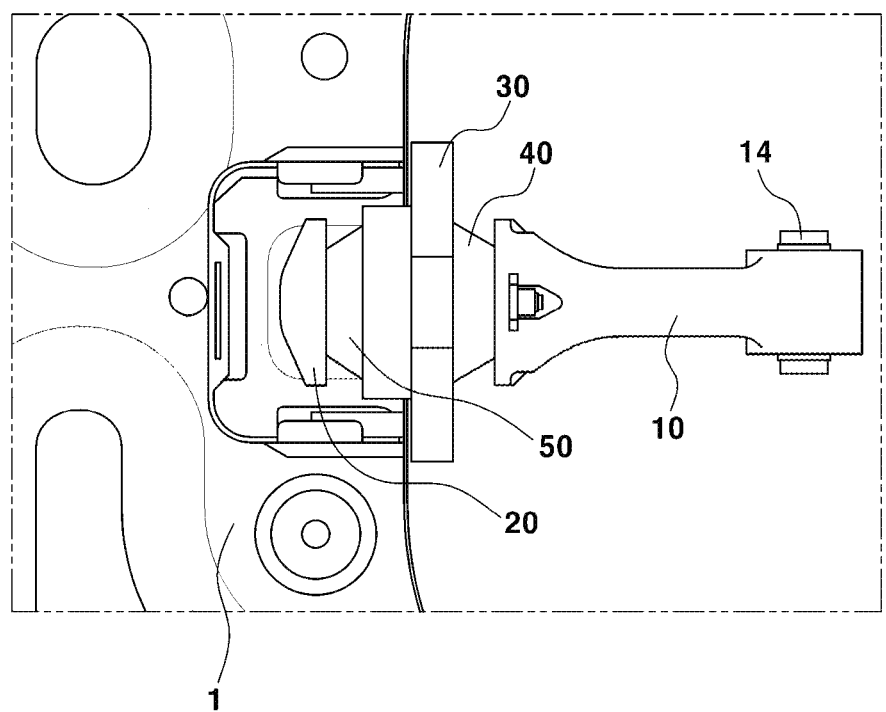
FIG. 6 is a view exemplarily illustrating the state in which the related art roll-rod for a vehicle is coupled.

In other words, as illustrated in FIG. 6, generally, the main case 30 is fastened to be mounted on the subframe 1 in the state in which one end portion of the roll-rod, that is, the rear insulator 50 and the end plate 20 are inserted into the subframe 1 (see FIG. 1A and FIG. 1B).

However, when the one end portion of the roll-rod is inserted into the subframe 1 as in general, the internal space of the sub-frame 1 is narrowed due to the inserted portion, causing interference when a motor driven power steering (MDPS) system is mounted.

To solve such a problem, as illustrated in FIG. 5, the case bracket housing 320 according to the present exemplary embodiment of the present disclosure is coupled to the external side of the subframe 1 in the state of supporting the external circumferential surfaces of the first rear insulator 200 and the second rear insulator 400, in the state in which the length of the case bracket housing 320 is reduced by the structure that prevents the second rear insulator 400 from protruding from the roll-rod. Accordingly, compared to the related art roll-rod mounting structure described above, the present disclosure may secure a free space inside the subframe 1, and as a result, the package of the roll-rod for the subframe 1 to which the R-MDPS module is applied may be easily secured.

Meanwhile, because the second rear insulator 400 is disposed at the rear side of the internal region A in the rod bar 120, when the vehicle starts suddenly, the second rear insulator 400 is elastically compressed due to the displacement of the powertrain apparatus caused by inertia, reducing the vibration transmitted from the outside.

Because the second rear insulator 400 has the same shape and configuration as the above-described first rear insulator 200, a detailed description thereof will be omitted. As illustrated in FIG. 4A and FIG. 4B, the second rear insulator 400 is disposed to face the first rear insulator 200 in the internal region A with the partition 310 disposed therebetween as a boundary.

The coupling member 500 is inserted into the rod bar 120 and passes through the first rear insulator 200 and the second rear insulator 400 to be coupled thereto, but selectively changes the compression amounts of the first rear insulator 200 and the second rear insulator 400 depending on coupling positions of the coupling member.

To the present end, the coupling member 500 includes a main body 510, a coupling guide 520, and a nut 530.

First, the main body 510 is accommodated on a seating portion 122 provided on the upper surface of the rod bar 120, and has a predetermined length to connect the first rear insulator 200 with the second rear insulator 400 in the front and rear direction thereof.

The coupling guide 520 is provided in a pair and protrudes from the bottom surface of the main body 510. One of the coupling guides 520 passes through a first coupling hole 122a in the rod bar 120 to be inserted into a first through hole 222-1 and 222-2 provided in the first insulator core portion 220 of the first rear insulator 200 and is fixed using the nut 530.

Furthermore, another one of the coupling guides 520 passes through a second coupling hole 122b in the rod bar 120 to be inserted into a second through hole 422-1 and 422-2 provided in the second insulator core portion 420 of the second rear insulator 400 and is fixed using the nut 530.

Here, the first through hole 222-1 and 222-2 and the second through hole 422-1 and 422-2 are each divided into a pair in the front and rear direction of the internal region A, and the one and the other one of the coupling guides 520 are each inserted thereinto by compressing the insulator rubber portions 210 and 410 depending on the characteristics during assembly.

For example, as illustrated in FIG. 4A, when the one and the other one of the coupling guides 520 are inserted into a first internal side through hole 222-1 and a second internal side through hole 422-1, respectively, which are located at the internal sides of the first through hole 222-1 and 222-2 and the second through hole 422-1 and 422-2, the compression amounts of the insulator rubber portions 210 and 410 are reduced, and this may be selectively applied when the compression characteristics of the insulators 200 and 400 are required to be reduced for NVH performance such as an idle vibration and rattling.

However, in the case in which the compression characteristics of the insulators 200 and 400 are required to be increased for R&H performance such as unity in traveling, rough road traveling, and a shock after impact, when the one and the other one of the coupling guides 520 are inserted into a first external side through hole 222-2 and a second external side through hole 422-2, which are located at the external sides of the first through hole 222-1 and 222-2 and the second through hole 422-1 and 422-2, respectively, as illustrated in FIG. 4B, the compression amounts of the insulator rubber portions 210 and 410 are increased by being further compressed by a predetermined gap compared to when the compression characteristics are required to be reduced. This may be selectively applied when the compression characteristics of the insulators 200 and 400 are required to be increased for R&H performance.

As a result, the roll-rod for a vehicle according to the exemplary embodiment of the present disclosure may solve the related art problem that insulators with different compression amounts must be separately manufactured and applied to satisfy NVH performance and R&H performance by selectively changing the compression amount to satisfy the NVH performance and R&H performance that conflict with each other in the same way as described above, and also, because it is unnecessary to manufacture a new mold, labor and costs for manufacturing the roll-rod may be reduced.

As is apparent from the above description, various aspects of the present disclosure are directed to providing the following effects.

Various aspects of the present disclosure are directed to providing a roll-rod for a vehicle, the roll-rod including a structure in which a pair of rear insulators each includes an insulator rubber portion and an insulator core portion that are combined with each other, the rear insulators disposed to face each other each has formed therein a pair of through holes, and a coupling member is inserted into the holes to fix the rear insulators in the state in which the compression amount of the insulator rubber portion is selectively changed. With the present structure, the roll-rod may easily secure a space on a subframe, and the characteristics of the insulator may be easily changed to satisfy NVH performance and R&H performance that conflict with each other.

Accordingly, the present disclosure may solve the related art problem that an insulator may be separately manufactured and applied when the characteristics of the roll-rod are required to be increased for the R&H performance such as unity in traveling, rough road traveling, and a shock after impact, or when the characteristics of the roll-rod are required to be decreased for the NVH performance such as idle vibration and rattling, and also, because it is unnecessary to manufacture a new mold, labor and costs for manufacturing the roll-rod may be reduced.

Furthermore, by changing the shape of the roll-rod and reducing the length thereof compared to the related art roll-rod, the internal space of the subframe may be secured and the package of the roll-rod to be mounted on the subframe, to which the R-MDPS module is applied, may be easily secured.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A roll-rod for a vehicle, the roll-rod comprising:
    a rod bracket including a front insulator therein to be connected to a powertrain apparatus;
    a first rear insulator disposed on a rod bar extending from the rod bracket and configured to reduce vibration transmitted thereto from outside;
    a case bracket disposed on the rod bar and connected to a subframe;
    a second rear insulator disposed to face the first rear insulator with the case bracket as a boundary therebetween and configured to reduce vibration transmitted thereto from outside; and
    a coupling member inserted into the rod bar and passing through the first rear insulator and the second rear insulator to be coupled thereto but configured to selectively change compression amounts of the first rear insulator and the second rear insulator depending on coupling positions of the coupling member.

2. The roll-rod of claim 1, wherein the first rear insulator includes:
    a pair of insulator rubber portions spaced from each other in a widthwise direction, and made of an elastic material to be compressible in a front and rear direction thereof; and
    an insulator core portion located between the insulator rubber portions, and including a through hole into which the coupling member is inserted.

3. The roll-rod of claim 2, wherein each of the insulator rubber portions has an inclined surface at a position where the insulator core portion is accommodated, and allows the compression amount to be increased as the coupling member is inserted into the insulator core portion to press the inclined surface in a selectively compressed or uncompressed state depending on characteristics during assembly.

4. The roll-rod of claim 2, wherein the coupling member includes:
    a main body accommodated on an upper surface of the rod bar; and
    a pair of coupling guides protruding from the main body, wherein one of the coupling guides passes through a first coupling hole in the rod bar and is inserted into a first through hole in the first rear insulator, and another one of the coupling guides passes through a second coupling hole in the rod bar and is inserted into a second through hole in the second rear insulator.

5. The roll-rod of claim 4, wherein the first through hole and the second through hole are each divided into a pair in a front and rear direction of the rod bar.

6. The roll-rod of claim 5, wherein the coupling member fixes the first rear insulator and the second rear insulator in a compressed state as the coupling guides are inserted into the first through hole and the second through hole each located at an external side of the divided first and second through holes.

7. The roll-rod of claim 4, wherein each of the first through hole and the second through hole includes a first internal side through hole and a second internal side through hole to reduce compression amount of the insulator rubber portions, and a first external side through hole and a second external side through hole configured to increase the compression amount of the insulator rubber portions.

8. The roll-rod of claim 1, wherein the case bracket includes:
    a partition provided with a pair of bent portions each including a 'H' shape to seat thereon upper and lower portions of the rod bar, and dividing the first rear insulator from the second rear insulator in the rod bar; and
    a case bracket housing surrounding external circumferential surfaces of the first rear insulator and the second rear insulator, and coupled to an external side of the subframe.

* * * * *